United States Patent
Shost et al.

(10) Patent No.: US 6,889,546 B2
(45) Date of Patent: May 10, 2005

(54) FUEL TANK INTERFACE ASSEMBLY

(75) Inventors: Mark Anthony Shost, El Paso, TX (US); Yingjie Lin, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/254,349

(22) Filed: Sep. 25, 2002

(65) Prior Publication Data
US 2004/0055378 A1 Mar. 25, 2004

(51) Int. Cl.$^7$ ................................................ G01F 23/00
(52) U.S. Cl. ........................ 73/291; 73/291; 73/292; 73/290 R; 702/55
(58) Field of Search ................ 73/291, 292, 290 R; 702/55

(56) References Cited

U.S. PATENT DOCUMENTS

| | | | |
|---|---|---|---|
| 4,244,210 A | * | 1/1981 | Prohaska et al. ............ 73/113 |
| 5,170,017 A | | 12/1992 | Stanevich et al. |
| 5,961,293 A | | 10/1999 | Clemmons et al. |
| 6,062,203 A | * | 5/2000 | Takahashi et al. ........... 123/509 |
| 6,192,869 B1 | * | 2/2001 | Hahner et al. ............... 123/509 |
| 6,252,499 B1 | * | 6/2001 | Gerdtz et al. ............. 340/450.2 |
| 6,351,104 B1 | * | 2/2002 | Koelle et al. .................. 322/22 |
| 6,424,924 B1 | * | 7/2002 | Wagner et al. ................. 73/149 |

FOREIGN PATENT DOCUMENTS

| | | |
|---|---|---|
| DE | 19925185 | 12/2000 |
| EP | 1031725 | 8/2000 |
| EP | 1090795 | 4/2001 |

* cited by examiner

Primary Examiner—Hezron Williams
Assistant Examiner—André K. Jackson
(74) Attorney, Agent, or Firm—Jimmy L. Funke

(57) ABSTRACT

A fuel tank interface assembly is provided. The assembly provides interface and control to a plurality of different types of components. Some of the components may be situated inside the tank. A connector is sealingly mounted through a single opening in the tank and is configured to provide at least two electrical leads for each different type of component in the tank. A unitary control unit is electrically coupled to the connector and is configured to provide control to each of the plurality of different type of components through the at least two electrical leads.

13 Claims, 1 Drawing Sheet

FUEL TANK INTERFACE ASSEMBLY

FIELD OF THE INVENTION

The present invention is directed to a fuel tank interface for sensing and control applications in land-based vehicles, and, more particularly, to an interface and control assembly for controlling and powering multiple electromechanical and/or electrical components that may be situated in the interior of a fuel tank of a vehicle.

BACKGROUND OF THE INVENTION

It is known to provide one or more components, e.g., electromechanical or electrical components, or both, in the interior of a fuel tank of a vehicle, such as a land-based vehicle. Examples of such components may include a fuel pump, a fuel level sensor, a fuel tank pressure sensor, a fuel quality sensor, etc. Commonly, each of such components may have different interface and control requirements, such as operational voltage levels, input/output (I/O) characteristics, electrical grounding requirements, signal processing architectures, connector requirements, etc., since these components may be manufactured by unrelated business entities, and may not be configured to meet a common interface standard.

In the event multiple components, such as modular components, need to be installed within the fuel tank to provide enhanced functionality in the vehicle, the logistics of providing a physically realizable integration of any such components may become very costly and time consuming. For example, providing an aggregation of separate electrical interfaces and/or controllers for each component that meets the allowable physical and budgetary constraints of the assembly, may be a daunting task, if at all possible.

In view of the foregoing considerations, it would be desirable to provide an improved interface and control assembly that, at relatively low-cost, allows simplifying the physical interface, and providing reliable control of multiple types of components used in fuel management applications. It would be further desirable to provide an assembly that, in an integrated fashion, provides a high degree of flexibility to vehicle manufacturers and their suppliers regarding the utilization and integration of multiple types of components in the interior of the fuel tank of the vehicle so as to provide an integrated fuel management system.

BRIEF SUMMARY OF THE INVENTION

A fuel tank interface assembly embodying aspects of the present invention allows integration of two or more types of in-tank components and provides a common interface and control for each of the distinct types of components. This is particularly advantageous to manufacturers of systems and/or components for land-based vehicles, such as the assignee of the present invention, since enhanced and integrated fuel management capability can now be achieved, without any undesirable proliferation of separate connecting harnesses, and control units, notwithstanding that such components may have been originally designed without any goal to share a common interface.

Generally, the present invention fulfills the foregoing needs by providing in one aspect thereof, a fuel tank interface assembly made up of a plurality of different types of components. Some of the components may be situated inside the tank. A connector sealingly mounted through a single opening in the tank and configured to provide at least two electrical leads for each different type of component in the tank. A unitary control unit electrically coupled to the connector and configured to provide control to each of the plurality of different type of components through each of the at least two electrical leads. In another aspect thereof, the present invention provides a kit for controlling and interfacing with a plurality of different types of components. At least some of the components are situated inside the tank. The kit is made up of a connector sealingly mounted through a single opening in the tank and configured to provide at least two electrical leads for each different type of component in the tank. The kit is further made up of a unitary control unit electrically coupled to the connector and configured to provide control to each of the plurality of different type of components through each of the at least two electrical leads.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
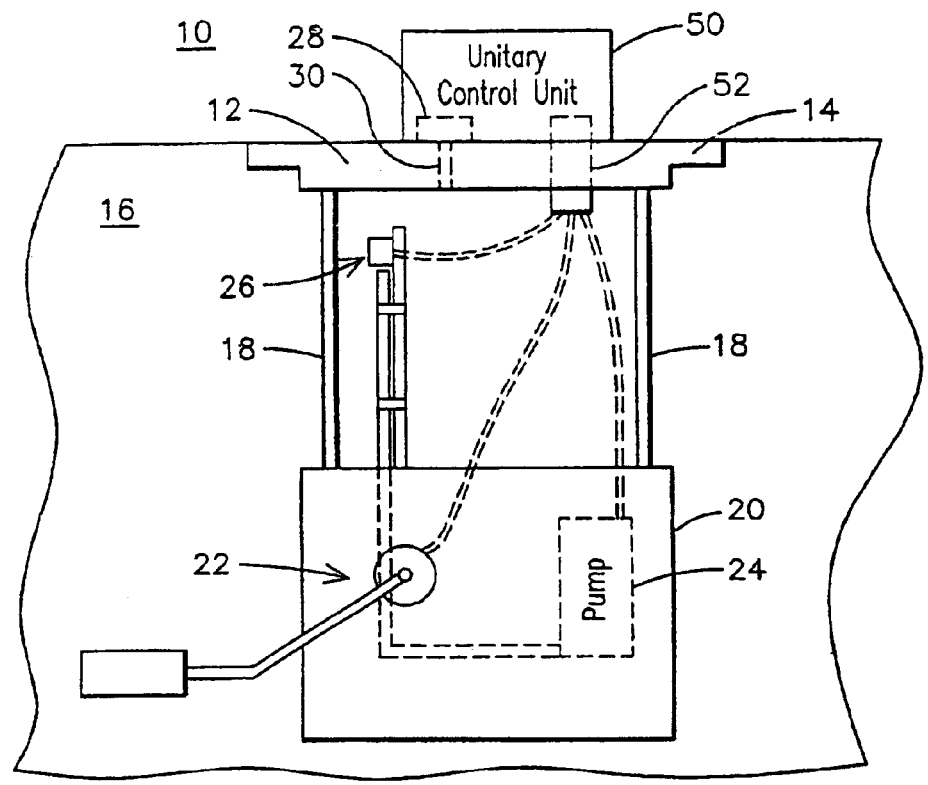
FIG. 1 is a schematic representation of an exemplary fuel tank interface assembly embodying aspects of the present invention.

FIG. 1 is a schematic of an exemplary interface and control assembly 10 embodying aspects of the present invention. In one exemplary embodiment, a cover plate 12 with a flange 14 is configured to sealingly close a single opening in a fuel tank 16. As will be readily understood by those skilled in the art, one or more rods 18 may extend downwardly from the cover plate to support a bucket 20 and, for example, through the use of spring-biasing means, urge the bucket to be positioned generally flush against the bottom surface of the tank. By way of example and not of limitation, bucket 20 may include a plurality of different types of electromechanical and/or mechanical components, such as a fuel level sensor 22, a fuel pump 24, a fuel tank tilt sensor 29, and a fuel quality sensor 26. The assembly may further include a fuel tank pressure sensor 28 external to the tank, yet in fluidic communication with the interior of the tank through a passageway 30. Thus, it will be understood that the principles of the present invention are not limited to components physically situated within the interior of the tank since some of the components could be outside the tank yet in communication with the interior of the tank, such as pressure sensor 28. It will be further understood that the present invention is not limited to the type of components illustrated in FIG. 1, since the invention is neither limited to the specific embodiments illustrated in that figure nor is the invention limited to the type of components illustrated in FIG. 1. For example, any other type of components, such as a fuel tank tilt indicator, etc., that could be used to sense fuel tank parameters and/or otherwise affect fluids that may be present within the tank may benefit from the teachings of the present invention.

The inventors of the present invention have innovatively recognized that integration of two or more in-tank components may now be efficiently achieved using a fuel tank kit made of a unitary control unit 50, and a connector 52, configured to provide a common interface and control for each of the distinct type of components. As used herein the expression "unitary control unit" refers to a controller configured to integrate the various control and/or processing needs of the distinct types of components coupled thereto into a single device. This result is particularly advantageous to manufacturers of systems and/or components for land-based vehicles, such as the assignee of the present invention, since enhanced and integrated fuel management capability can now be achieved, without any undesirable proliferation of separate connecting harnesses, and control units, notwithstanding that such components may have been originally designed without any goal to share a common interface. Once again, the term in-tank components should not be narrowly constructed since, as suggested above, it is contemplated that some of the components do not have to be physically within the inside of the tank.

In one exemplary embodiment, control unit 50 includes a multi-voltage regulator 54 that receives power (e.g., 12V of direct current (DC) voltage) from a power voltage source (not shown) in the vehicle, such as battery, alternators, etc. As suggested above, the voltage levels required by each respective component may not be the same. For example, one of the components may be designed to operate at 15V, another may be designed to operate at 5V, etc. In one aspect of the present invention, voltage regulator 54 is configured to convert the received vehicle voltage to any voltage level appropriate to the operational needs of any given component. In the foregoing example, regulator 54 would include a first regulator circuit configured to provide 15V for the one component, and would further include a second regulator circuit configured to provide 5V for the other component. In another aspect of the invention, control unit 50, for example, through voltage regulator 54 and connector 52 allows providing a common electrical ground to each of the components. This is conducive to avoiding undesirable ground loops that could result in inaccurate readings and possibly even in the creation of potentially hazardous extraneous electrical currents in an environment with flammable vapors. It will be appreciated that each electrical connection for the components that make up the assembly need not be made through connector 52. For example, there may be some components disposed outside the fuel tank, such as tank pressure sensor 28, for which connecting means other than connector 52, such as electrically conductive paths in a printed circuit board, or through a flexible circuit, may be used to provide electrical connections that do not require entry of electrical leads into the interior of the tank.

Figure 2:
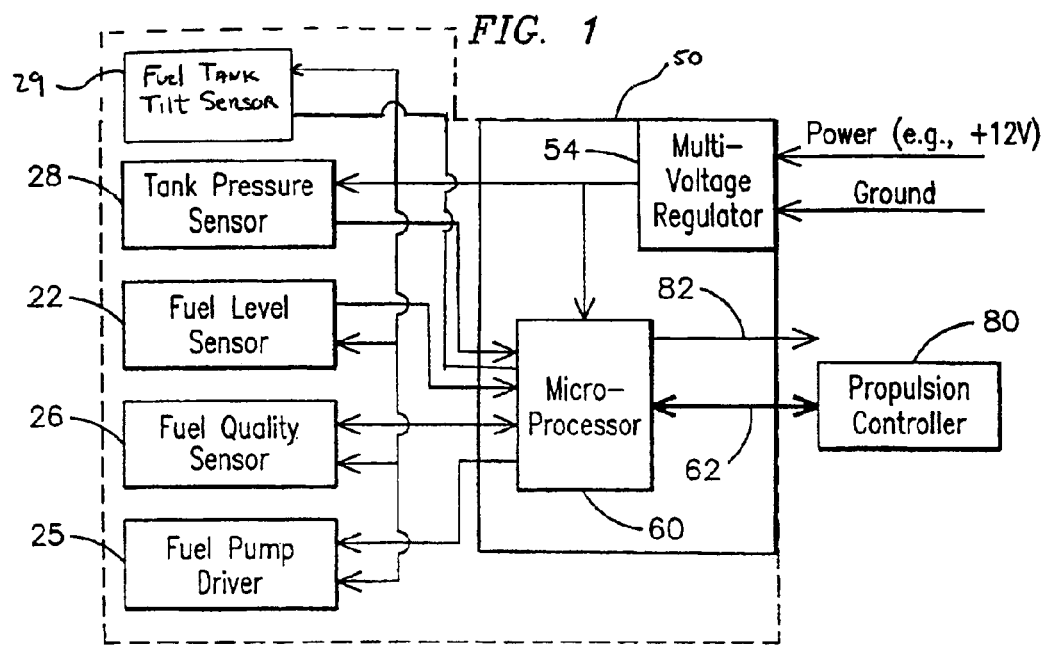
FIG. 2 is a block diagram of an exemplary unitary control unit that may be used by the fuel tank interface assembly of FIG. 1.

As illustrated in FIG. 2, control unit 50 further includes a processor 60, (e.g., a microprocessor) configured to provide any appropriate signal processing and/or conditioning to the respective input/output signals of the multiple components that make up the assembly 10. In another aspect of the invention, processor 60 may be configured to communicate via a data bus 62, (e.g., a CAN or LIN bus or any other digital data bus) information to a vehicle propulsion controller 80 from each of the in-tank components. This multiplexing technique of data communication is particularly advantageous in the automotive industry since it avoids the large proliferation of bulky wiring harnesses that take valuable space in the vehicle, and eventually become burdensome during servicing and/or repair operations. Analogue output ports 82 may also be provided to supplement and and/or complement information carried by data bus 62.

In operation, the above-described approach is conducive to achieving a "tight" integration of modular components. For example, the propulsion controller may issue a command for generating a certain flow of fuel to the engine. A unitary control unit embodying aspects of the present invention would allow to quickly determine whether there is enough fuel in the tank to support such flow of fuel. In addition, cross-checking of diagnostics routines may be easier to achieve to more accurately and quickly determine the status of any given component in a tightly integrated fuel management design, such as is contemplated in accordance with aspects of the present invention, as opposed to collecting and analyzing data from uncoupled or loosely coupled components.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A fuel tank interface assembly for providing an integrated interface and control to different types of components for a fuel system, said assembly comprising:
    a plurality of different types of components, at least some of the components situated inside the tank, at least some of the plurality of different types of components being configured to sense distinct fuel parameters;
    a connector sealingly mounted through a single opening in the tank and configured to provide at least two electrical leads for each different type of component in the tank; and
    a unitary control unit electrically coupled to the connector and configured to provide contemporaneous control to each of the plurality of different type of components through each of the at least two electrical leads, the control unit comprising a multi-voltage regulator adapted to a first voltage to at least one of said components and a second, distinct voltage to a second component and a processor configured to receive and process contemporaneous measurements from the different types of components.

2. The interface assembly of claim 1 wherein at least some of the measurements are digitized by the processor.

3. The interface assembly of claim 2 further comprising a data bus coupled to the processor to output a stream of digitized data indicative of measurements from each of the different type of components.

4. The interface assembly of claim 1 further comprising analogue output ports coupled to the processor to output respective analogue data indicative of measurements from each of the different type of components.

5. The interface assembly of claim 1 wherein the plurality of different types of components are selected from the group consisting of electrical and electromechanical components.

6. The interface assembly of claim 1 wherein the plurality of different types of components are selected from the group consisting of a fuel pump, a fuel level sensor, a fuel quality sensor, a fuel tank pressure sensor, and a fuel tank tilt sensor.

7. The interface assembly of claim 1 wherein some of the plurality of different types of components may be external to the tank.

8. The interface assembly of claim 1 further comprising means for electrically coupling any external components to the unitary control unit.

9. A fuel tank kit for controlling and interfacing with a plurality of different types of components, at least some of the components situated inside the tank, at least some of the plurality of different types of components being configured to sense distinct fuel parameters and having distinct interface and/or control requirements, the kit comprising:

a connector sealingly mounted through a single opening in the tank and configured to provide at least two electrical leads for each different type of component in the tank, and a unitary control unit electrically coupled to the connector and configured to provide contemporaneous control to each of the plurality of different type of components through each of the at least two electrical leads, the control unit comprising a multi-voltage regulator adapted to provide a first voltage to at least one component and a second, distinct voltage to a second component and a processor configured to receive and process contemporaneous measurements from the different types of components.

10. The kit of claim 9 wherein at least some of the measurements are digitized by the processor.

11. The kit of claim 9 further comprising a data bus coupled to the processor to output a stream of digitized data indicative of measurements from each of the different type of components.

12. The kit of claim 9 further comprising analogue output ports coupled to the processor to output respective analogue data indicative of measurements from each of the different type of components.

13. A fuel tank interface assembly comprising:

a plurality of different types of components, at least some of the components situated inside the tank;

a connector sealingly mounted through a single opening in the tank and configured to provide at least two electrical leads for each different type of component in the tank; and a unitary control unit electrically coupled to the connector and configured to provide control to each of the plurality of different type of components through each of the at least two electrical leads, wherein the unitary control unit includes a multi-voltage regulator configured to provide a power voltage signal appropriate to meet any distinct power voltage level for the different type of components.

* * * * *